United States Patent Office 3,781,335
Patented Dec. 25, 1973

3,781,335
PREPARATION OF DIFLUORONITROETHYL-PERFLUORO ACRYLATE AND RELATED COMPOUNDS
Leonard O. Ross, Sunnyvale, and Marion E. Hill, Palo Alto, Calif., assignors to the United States of America as represented by the United States Atomic Energy Commission
No Drawing. Filed Jan. 11, 1972, Ser. No. 217,042
Int. Cl. C07c 69/54
U.S. Cl. 260—486 H                                    6 Claims

ABSTRACT OF THE DISCLOSURE

Perfluoroacrylyl chloride is reacted with 2,2,2-difluoronitroethanol under basic catalytic conditions to produce 2,2,2-difluoronitroethylperfluoro acrylate with $$NO_2CF_2CH_2OCF_2CFHCOCl$$

Under acidic catalytic conditions the terminal fluorine is replaced giving ClCF=CFCOCl with ester and alcohol adduct products. The use of reduced pressure was found necessary in the production of the initial acid chloride reagent. Other related derivatives are described.

BACKGROUND OF THE INVENTION

The invention herein was made under, or in the course of Contract No. AT(04-3)-115, Project Agreement No. 51, Modification No. 1, with the United States Atomic Energy Commission.

Fluorinated-nitrated organic compounds are employed in rocket fuel formulations and explosive formulations as plasticizers, polymerizable binders and as oxidizers or primary fuel components. Typical explosive formulations are disclosed, for example, in U.S. Pat. No. 3,480,490, issued Nov. 25, 1969 to Milton Finger et al.

SUMMARY OF THE INVENTION

This invention relates, generally, to the production of fluoronitro-compounds and, more particularly, to the preparation of 2,2,2-difluoronitroethylperfluoro acrylate and related compounds.

Perfluoroacrylic acid (I) may be prepared by several methods known in the prior art. However, a most effective method involves the Grignard reaction in which iodo-trifluoroethylene is reacted with magnesium followed by carbonation with dry carbon dioxide somewhat as disclosed by I. L. Knunyants et al., Bull. Acad. Sci., U.S.S.R. 11, 1297 (1958).

The direct esterification of perfluoroacrylic acid (I) with 2,2,2-difluoronitroethanol by conventional methods was found not to be adequate to yield appreciable amounts of the ester. Thereafter a far superior procedure involving perfluoroacrylyl chloride was devised.

The synthesis of perfluoroacrylyl chloride (II) (perfluoroacrylyl chloride) by reacting perfluoroacrylic acid with phosphorous pentachloride was reported by B. E. Gruz et al., Zh. Obshch Khim, 34, No. 12, 4122 (1964); however, necessary reaction conditions were not disclosed. Perfluoroacrylic acid reacted with about an equimolar of phosphorous pentachloride at room temperature yields about 10% of perfluoroacrylyl chloride (II) and about 40% of an unexpected product, 3-chloro-2,3,3-trifluoropropionyl chloride.

Perfluoroacrylyl chloride production has been found to be greatly enhanced by the dropwise addition of a solution of perfluoroacrylic acid in benzoyl chloride at reduced pressures below about 10 mm. Hg., while the production of the propionyl chloride compound is suppressed. The reaction is conducted in a reaction vessel adapted for removal and collection of the product as it forms. At pressures above about 10 mm. Hg the production of the compound 3-chloro-2,3,3-trifluoropropionyl chloride is increased considerably.

Chlorinating agents, other than phosphorous pentachloride, such as thionylchloride, phosphorous trichloride and phosphorous oxychloride were completely unreactive.

For esterification purposes perfluoroacrylyl chloride II is reacted with 2,2,2-difluoronitroethanol in the presence of triethylamine or similar basic catalyst and at a temperature of below about −30° C. yielding 2,2,2-difluoronitroethyl perfluoroacrylate (III) together with an alcohol addition by-product, i.e., 3-(2,2,2-difluoronitroethoxy)-2,3,3-trifluoropropionyl chloride (IV) which appears in the reaction product.

Aluminum chloride is reacted with 2,2,2-difluoroethanol in a one to one ratio at low concentrations yielding the dichloroaluminate of the alcohol. Such product is then reacted with perfluoroacrylyl chloride yielding 3-chloro-trans-2,3-difluoroacrylyl chloride (V) almost, exclusively.

At higher concentrations several products were produced including major proportions of

(V)

and minor proportions of

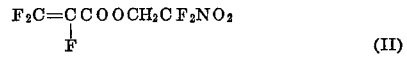

(II)

and $O_2NCF_2CH_2OCF_2CHFCOCl$. Alcohol dichloroaluminate yields similar results.

Accordingly, it is an object of the invention to provide methods for producing difluoronitroethyl perfluoroacrylate ester and related compounds.

Another object of the invention is to provide novel difluoronitroethyl perfluoroacrylate ester and related compositions of matter.

Other objects and advantageous features of the invention will be apparent in the following description.

DESCRIPTION OF THE INVENTION

Perfluoroacrylic acid (I): A solution of iodotrifluoroethylene in ether is added slowly to a rapidly stirred slurry of activated magnesium under an inert gas (nitrogen) atmosphere at a temperature in the range of about −20 to 5° C. The magnesium is activated by adding a dilute solution of ethyl bromide in ether whereupon a vigorous surface reaction ensues and the ether is immediately decanted. The magnesium is then washed with successive portions of ether, e.g., three portions of ether to remove residual traces of ethyl magnesium bromide formed during the foregoing reaction.

During the period of stirring the reaction proceeds with the formation of a tan colored solution and stirring is continued for sufficient time, e.g., an additional hour to permit the reaction to proceed to completion. The Grignard reagent prepared in this fashion is separated from the unreacted magnesium and is transferred to a reaction vessel equipped for stirring and cooled to about −70° C. Dry carbon dioxide is then passed through the solution while stirred for an extended period of time, e.g., 24 hours at a temperature of −70 to −40° C. during which time a solid precipitates. The reaction mixture is then allowed to come to ambient temperature and is intermixed slowly with a dilute solution, e.g., 2 N, of $H_2SO_4$. The solution is then extracted with successive portions of ether solvent, the extract is dried, e.g., over anhydrous sodium sulfate, and the volume of dry extract is reduced as by evaporation under reduced pressure. The concentrated solution is stirred with mercury to remove iodine which solution is then separated from residual mercury and mercury iodide and evaporated under reduced pressure leaving a dark red residual product. The product is purified by subliming at room temperature and at reduced pressure below about 1.0 mm. Hg into a receiver maintained at ice saltwater temperatures and a successive second receiver maintained at Dry Ice-acetone temperatures. The perfluoroacrylic acid product collected in the first receiver is gas-chromatographically pure. Two-fold resublimation of that collected in the second receiver yields similar purity product with a total collected yield of at least about 40% of perfluoroacrylic acid (II).

Perfluoroacrylyl chloride (II) is prepared by a preferred process in which a mixture of phosphorous pentachloride in degassed benzoyl chloride is added to a solution of perfluoroacrylic acid (I) in benzoyl chloride at a pressure below about 10 mm. Hg, e.g., at 7 mm. Hg pressure at such a rate that evolved HCl does not appreciably increase said pressure. Proportions corresponding to about 1 g. of phosphorous pentachloride to 1 ml. of benzoyl chloride and about 1 g. of (I) may be used. Under these conditions the perfluoroacrylyl chloride (II) evolves from the reaction mixture as it forms and is collected at low temperatures, e.g., in two series-connected, Dry-Ice cooled receivers. The collected product contains perfluoroacrylyl chloride (II) with minimized amounts of α-hydro-β-chlorotrifluoropropionyl chloride. The perfluoroacrylyl chloride may be recovered by flash distillation.

At higher pressures, i.e., above 10 mm. Hg, e.g., 15 mm. to 20 mm. Hg, the addition of HCl to perfluoroacrylic acid (I) or its chloride (II) is enhanced to produce more of the propionylchloride product. This product can be recovered by flash distillation to remove the perfluoroacrylyl chloride (II).

2,2,2-difluoronitroethyl perfluoroacrylate (III): 2,2,2-difluoronitroethanol in the presence of triethylamine as a dilute solution in a low-boiling ether, e.g., diethyl ether is added slowly to a stirred solution of perfluoroacrylyl chloride in ether at a temperature below about −25° C., e.g., in the range of about −30 to about −40° C., preferably in the range of about −35 to −40° C. to yield 2,2,2-difluoronitroethylacrylate therein. Equivalent molar proportions, i.e., about 1:1:1 ratios of said reagents may be used. The reaction mixture is filtered and the ether solvent removed by vacuum evaporation, e.g., below about 20 mm. Hg at room temperature leaving a residual liquid product. Three major components in a ratio of about 3:1:3 exist in the product. Two products may be removed by vacuum distillation at 40° C. and 0.2 mm. Hg pressure into a Dry Ice-acetone cooled receiver. Fractional distillation of the distillate separates the ester, 2,2,2-difluoronitroethyl perfluoroacrylate (III) with a boiling point of about 65° C. at 10 mm. Hg therefrom with some 2,2,2-difluoronitroethanol as an impurity. The second product is 2,2,2-difluoronitroethoxytrifluoropropionyl chloride (IV). The residual product from the first distillation is distilled at 85–87° C. at 0.1 mm. Hg for which product the structure has not been determined. Other separation methods may also be used.

REACTION OF PERFLUOROACRYLYL CHLORIDE AND ALUMINUM CHLORIDE CATALYST

Equimolar proportions of AlCl₃ and 2,2,2-difluoronitroethanol as dilute solutions in chloroform are intermixed and stirred as long as hydrogen chloride evolves. Then a 1.5 molar proportion of perfluoroacrylyl chloride is added to the solution which is stirred usually for more than 15 hours. The reaction mixture is washed with cold concentrated hydrochloric acid, is dried as over magnesium sulfate and the resulting solution mixture is separated as by gas chromatography, distillation, etc. Three major and seven minor products are obtained by gas chromatography, which three major products are as follows:

Major portion is 3-chlorotransdifluoropropenyl chloride

(IV)

Second fraction (40% of first) is 2,2,2-difluoronitroethyl perfluoro/acrylate $$F_2C=CFCOOCH_2CF_2NO_2 \qquad (III)$$

Third fraction (40% of first) is 2,2,2-difluoronitroethoxytrifluoropropionyl chloride

NMR data for various compounds described herein are presented in the following table:

TABLE.—NUCLEAR MAGNETIC RESONANCE DATA ON FLUORONITRO PRODUCTS [1]

| Compound | Spectrum | Peak | Assignment | Peak position | J value (cps.) |
| --- | --- | --- | --- | --- | --- |
| $\underset{F_2}{\overset{F_1}{>}}C=\underset{|}{\overset{F_3}{C}}CO_2H$ (I) | F¹⁹<br>F¹⁹<br>F¹⁹ | Two doublets<br>do<br>do | $F_1$<br>$F_2$<br>$F_3$ | 86.0 p.p.m.<br>95.0 p.p.m.<br>178.0 p.p.m. | $J_{1,3}=35; J_{1,2}=25$<br>$J_{2,3}=116; J_{2,1}=25$<br>$J_{3,2}=116; J_{3,1}=37$ |
| $\underset{F_2}{\overset{F_1}{>}}C=\underset{|}{\overset{F_3}{C}}COCl$ (II) | F¹⁹<br>F¹⁹<br>F¹⁹ | do<br>do<br>do | $F_1$<br>$F_2$<br>$F_3$ | 76.0 p.p.m.<br>86.7 p.p.m.<br>168.0 p.p.m. | $J_{1,3}=42; J_{1,2}=8.6$<br>$J_{2,3}=117; J_{2,1}=8.6$<br>$J_{3,2}=117; J_{3,1}=44$ |
| $\underset{F_2}{\overset{F_1}{>}}C=CCO_2CH_2CF_2NO_2$ (III) | F¹⁹<br>F¹⁹<br>F¹⁹<br>F¹⁹<br>H¹ | do<br>do<br>do<br>Triplet<br>do | $F_1$<br>$F_2$<br>$F_3$<br>—CH₂CF₂NO₂<br>—CH₂CF₂NO₂ | 78.5 p.p.m.<br>90.0 p.p.m.<br>180.0 p.p.m.<br>91.5 p.p.m.<br>5.2 τ | $J_{1,3}=37; J_{1,2}=8.0$<br>$J_{2,3}=117; J_{2,1}=8.0$<br>$J_{3,2}=117; J_{3,1}=37$<br>$J=7$<br>$J=10$ |
| $\underset{F_1}{\overset{Cl}{>}}C=\overset{F_2}{C}COCl$ (V) | F¹⁹<br>F¹⁹ | Doublet<br>do | $F_1$<br>$F_2$ | 143 p.p.m.<br>86 p.p.m. | $J_{2,1}=142$<br>$J_{1,2}=142$ |
| $\underset{F_2\ H}{ClC-\overset{F_1}{\underset{|}{C}}-\overset{F_3}{\underset{|}{C}}-COCl}$ | F¹⁹<br>F¹⁹<br>H¹ | Quadruplet<br>Two triplets<br>Four doublets | $F_1F_2$<br>$F_3$<br>Asymmetric proton split by nonequivalent fluorines. | 61.5 p.p.m.<br>177.0 p.p.m.<br>5.0 τ | $J_{1,2,3}=75$<br>$J(F_3,H)=46; J_{3,1}=15$<br>$J(FF)=15$<br>$J(HF)=46$ |
| O₂NCF₂CH₂OCF₂CFHCOCl (IV) | F¹⁹<br>F¹⁹<br>F¹⁹<br>F¹⁹ | Multiplets<br>Broad singlet (probably unresolved triplet).<br>Two triplets | —CH₂OCF₂—<br>O₂NCF₂—CH₂—<br>Asymmetric CHF | 62.0 p.p.m.<br>92.5 p.p|m.<br>220 p.p.m. | 43 |

[1] In all spectra, tetramethylsilane was the internal reference for proton and FCCl₃ for fluorine; spectrometer was a Varian HA-100.

Further details relating to the invention will be apparent in the following illustrative examples:

Example I

Perfluoroacrylic acid (I): Under a nitrogen atmosphere 21.0 g. (0.101 mole) of iodotrifluoroethylene in 50 ml. of ether were added over a period of 30 minutes to a rapid stirring mixture of 5.0 g. (0.206 mole) of activated magnesium[1] in 70 ml. of ether at -20 to 5° C. During this time the magnesium was reacting and a tan solution developed. The mixture was allowed to stir an additional hour to allow the reaction to go to completion. The Grignard solution was decanted from the unreacted magnesium and transferred to a 500 ml. round-bottomed flask equipped with overhead stirring and cooled to -70° C. Dry carbon dioxide was passed through the stirring solution at -70 to -40° C. over a period of 24 hours; during this time a solid precipitated. The mixture was allowed to come to 20° C. and was added slowly to 150 ml. of 2 N sulfuric acid. The solution was then extracted with ten 15 ml. portions of ether. The combined ether solutions were dried over sodium sulfate, filtered, and concentrated at 18 mm. to a volume of 50 ml. This solution was stirred vigorously with 1 pound of mercury for 2 to 4 hours to remove the iodine. The ether solution was separated from unreacted mercury and mercury iodide. The solution was evaporated at room temperature at 18 mm., leaving a dark red residue. The residue was sublimed at 0.5 mm. and room temperature into a round-bottomed flask surrounded by an ice saltwater bath connected in series to a round-bottomed flask surrounded by a Dry-Ice acetone bath. The acid collected in the flask surrounded by the ice salt bath was gas-chromatographically pure. Resublimation of the material from the Dry-Ice acetone bath through the same system twice and collecting all fractions gave 5.9 g. (45%) of perfluoroacrylic acid.[2]

Example II

Perfluoroacrylyl chloride: To a rapidly stirring mixture of 30 g. (0.143 mole) of phosphorous pentachloride in 25 ml. of benzoyl chloride were added, under 7 mm. Hg pressure, 13.2 g. (0.105 mole of perfluoroacrylic acid in 20 ml. of benzoyl chloride[3] at such a rate that the hydrogen chloride liberated from the reaction mixture did not appreciably increase the Hg pressure. Under these conditions, the perfluoroacrylyl chloride was removed from the reaction mixture as it was formed,[4] through 50 cm. of a Bantamware condenser rising vertically from the reaction vessel into two Dry-Ice acetone cooled receivers in series. The crude material consisted of perfluoroacrylyl chloride, α-hydro-β-chlorotrifluoropropionyl chloride, phosphorous oxychloride, and benzoyl chloride. Flash distillation of the mixture through a 2-inch column gave 8.6 g. (60%) of perfluoroacrylyl chloride, B.P. 54–58° C. at 760 mm.

Example III 2,2,2-difluoronitroethyl perfluoroacrylate: To a stirring solution of 3.9 g. (0.027 mole) of perfluoroacrylyl chloride in 100 ml. of ether at -35 to -40° C. was added a solution of 3.4 g. (0.027 mole) of 2,2,2-difluoronitroethanol and 2.72 g. (0.027 mole) of triethylamine in 40 ml. of ether over 40 minutes. The solution was filtered and the ether was removed at room temperature and 18 mm., leaving 1.0 g. of liquid material. A gas-chromatographic analysis of the material indicated three major compounds were present in a ratio of 3:1:3. The first two products were removed at 10° C./0.2 mm. and collected in a flask surrounded by Dry-Ice acetone. Fractional distillation of the material gave 0.5 g. (7.9%) 2,2,2-difluoronitroethyl perfluoroacrylate, B.P. ~65° C. at 10 mm., with 10% of 2,2,2-difluoronitroethanol as an impurity. The second product (0.4 g., 7%) was identified as 2,2,2-difluoronitroethoxy-trifluoropropionyl chloride. The residue or undetermined product was distilled at 85–87° C. at 0.1 mm.

Example IV

Reaction of perfluoroacrylyl chloride with 2,2,2-difluoronitroethanol and aluminum chloride catalyst: To 0.266 g. (0.002 mole) of aluminum chloride in 0.5 g. of chloroform was added 0.254 g. (0.002 mole) of 2,2,2-difluoronitroethanol in 0.1 g. of chloroform. The solution was allowed to stir for 1 hour as hydrogen chloride continued to evolve. To this solution was then added 0.3 g. (.003 mole) of perfluoroacrylyl chloride and the mixture was allowed to stir for 18 hours. The solution was washed with 1 ml. of cold concentrated hydrochloric acid, dried over magnesium sulfate, and the resulting solution was chromatographed on an SE–30 f-ft. column. The gas chromatogram indicated that 3 major and 7 minor products were formed in this reaction. These products, assigned peaks A, B, C, were collected by gas chromatography and identified.

The major fraction, peak A, was identified as 3-chlorotransdifluoropropenyl chloride

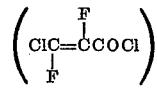

Calcd. for $C_3Cl_2F_2O$ (percent): C, 22.4; Cl, 44. Found (percent): C, 22.35; Cl, 39.8.

Peak B was 40% of peak A and was identified as 2,2,2-difluoronitroethyl perfluoroacrylate

Calcd. for $C_5H_2F_5NO_4$ (percent): C, 25.5; H, 0.85; N, 5.95. Found (percent): C, 24.7; H, 1.04; N, 5.60.

Peak C was also 40% of peak A and was identified as 2,2,2-difluoronitroethoxy-trifluoropropionyl chloride

Calcd. for $C_5H_3ClF_5NO_4$ (percent): C, 22.2; H, 1.1; Cl, 13.1; N, 5.10. Found (percent): C, 21.5; H, 1.32; Cl, 15.61; N, 4.30. Spectra for all these products are included in the table.

While there has been described in the foregoing what may be considered to be preferred embodiments of the invention modifications within the skill of the art may be made therein and it is intended to cover all such as fall within the scope of the appended claims.

What we claim is:

1. In a process for preparing a 2,2,2-difluoronitroethanol ester of perfluoroacrylic acid, the steps comprising:

contacting 2,2,2-difluoronitroethanol with perfluoroacrylyl chloride in an ether solution in the presence of a basic catalyst at a temperature below about -25° C. to produce a reaction mixture containing 2,2,2-difluoronitroethylperfluoro acrylate with by-products; and separating said 2,2,2-difluoronitroethyl perfluoro acrylate product from the reaction mixture.

2. A process as set forth in claim 1 wherein said perfluoroacrylyl chloride is prepared by a process in which phosphorous pentachloride is contacted with perfluoroacrylic acid in a benzoyl chloride solution at a vacuum pressure below about 10 mm. Hg whereupon perfluoroacrylyl chloride is formed and vaporizes from the reac- ---
[1] The magnesium was activated by adding 2 grams of ethyl bromide in 30 ml. of ether. A vigorous reaction occurred, and the ether immediately decanted. The magnesium was washed three times with 15 ml. portions of ether to remove final traces of ethyl magnesium bromide.
[2] Because perfluoroacrylic acid is very hygroscopic, it is difficult to obtain a good melting point. The best melting point obtained was 24–27° C.
[3] Benzoyl chloride can be degassed of hydrogen chloride by stirring under 7 mm. of mercury for 15–20 minutes.
[4] Hydrogen chloride very quickly adds to perfluoroacrylic acid or its acid chloride. Runs whose pressure was allowed to increase to 15–20 mm. showed a considerable increase in the amount of α-hydro-β-chlorotrifluoropropionyl chloride formed.

tion mixture and wherein said vaporized perfluoroacrylyl chloride is collected by condensation at a low temperature.

3. A process as set forth in claim 2 wherein said basic catalyst comprises triethylamine, wherein said 2,2,2-difluoronitroethanol and perfluoroacrylyl chloride are contacted at a temperature in the range of about —30° C. to about —40° C., and wherein about equivalent molar proportions of said reagents and catalyst are employed.

4. A process as set forth in claim 2 wherein said reaction mixture contains 2,2,2-difluoronitroethylperfluoroacrylate product together with by-product 2,2,2-difluoronitroethoxytrifluoropropionyl chloride,
wherein ether is removed from the reaction mixture, and wherein said product 2,2,2-difluoronitroethylperfluoroacrylate and by-product 2,2,2-difluoronitroethoxytrifluoropropionyl chloride are separated by vacuum distillation.

5. A process as set forth in claim 4 wherein said phosphorous pentachloride is contacted with said perfluoroacrylic acid at a vacuum pressure above about 10 mm. Hg to enhance production of said 2,2,2-difluoronitroethoxytrifluoropropionyl.

6. The compound 2,2,2 - difluoronitroethylperfluoroacrylate.

References Cited
UNITED STATES PATENTS

| | | | |
|---|---|---|---|
| 3,316,292 | 4/1967 | Schaeffler | 260—486 H |
| 3,436,382 | 4/1969 | Reed | 260—486 H |
| 3,732,288 | 5/1973 | Coon | 260—486 H |

LORRAINE A. WEINBERGER, Primary Examiner

P. T. KILLOS, Assistant Examiner

U.S. Cl. X.R.

260—539 R, 544 Y